(12) United States Patent  
Geusic

(10) Patent No.: US 7,964,124 B2
(45) Date of Patent: *Jun. 21, 2011

(54) METHOD OF FORMING CELLULAR MATERIAL

(75) Inventor: Joseph E. Geusic, Berkeley Heights, NJ (US)

(73) Assignee: Micron Technology, Inc., Boise, ID (US)

(*) Notice: Subject to any disclaimer, the term of this patent is extended or adjusted under 35 U.S.C. 154(b) by 1529 days.

This patent is subject to a terminal disclaimer.

(21) Appl. No.: 11/353,406

(22) Filed: Feb. 14, 2006

(65) Prior Publication Data

US 2006/0138708 A1    Jun. 29, 2006

Related U.S. Application Data

(63) Continuation of application No. 10/382,246, filed on Mar. 5, 2003, now abandoned, and a continuation-in-part of application No. 11/005,712, filed on Dec. 7, 2004, now Pat. No. 7,054,532, which is a continuation of application No. 10/052,952, filed on Jan. 17, 2002, now Pat. No. 6,898,362.

(51) Int. Cl.
  *B28B 1/48* (2006.01)
  *B29C 71/02* (2006.01)
(52) U.S. Cl. ......... 264/154; 264/155; 264/156; 264/346
(58) Field of Classification Search .................. 264/154, 264/155, 156, 346
  See application file for complete search history.

(56) References Cited

U.S. PATENT DOCUMENTS

| | | |
|---|---|---|
| 3,497,455 A | 2/1970 | Ahr |
| 4,053,925 A | 10/1977 | Burr et al. |
| 4,756,956 A | 7/1988 | Nagai et al. |
| 4,962,058 A | 10/1990 | Cronin et al. |
| 4,992,321 A | 2/1991 | Kandachi et al. |
| 5,055,426 A | 10/1991 | Manning |
| 5,110,754 A | 5/1992 | Lowrey et al. |

(Continued)

FOREIGN PATENT DOCUMENTS

EP    1085352    3/2001

(Continued)

OTHER PUBLICATIONS

Ban Hart, John, "Manufacture, characterisation and application of cellular metals and metal foams", *Progress in Materials Science*, vol. 46, Issue 6, (2001),599-632.

(Continued)

*Primary Examiner* — Leo B Tentoni
(74) *Attorney, Agent, or Firm* — Schwegman, Lundberg & Woessner, P.A.

(57) ABSTRACT

Systems, devices and methods are provided that are related to cellular materials that have a precisely-determined arrangement of voids formed using surface transformation. In various embodiments, the cellular materials are suitable for use in various structural, mechanical and/or thermal applications. One aspect of the present subject matter is a method of forming cellular material. According to various embodiments of the method, a predetermined arrangement of the plurality of holes is formed in a volume of material through a surface of the volume of material. The volume of material is annealed such that the volume of material undergoes a surface transformation in which the arrangement of the plurality of holes is transformed into a predetermined arrangement of at least one empty space below the surface of the volume of material. Other aspects are provided herein.

46 Claims, 9 Drawing Sheets

U.S. PATENT DOCUMENTS

| | | |
|---|---|---|
| 5,250,459 A | 10/1993 | Lee |
| 5,404,029 A | 4/1995 | Husher et al. |
| 5,471,180 A | 11/1995 | Brommer et al. |
| 5,526,449 A | 6/1996 | Meade et al. |
| 5,527,739 A | 6/1996 | Parrillo et al. |
| 5,599,745 A | 2/1997 | Reinberg |
| 5,639,684 A | 6/1997 | Kwok |
| 5,723,896 A | 3/1998 | Yee et al. |
| 5,739,796 A | 4/1998 | Jasper et al. |
| 5,798,559 A | 8/1998 | Bothra et al. |
| 5,811,870 A | 9/1998 | Bhattacharyya et al. |
| 5,818,761 A | 10/1998 | Onakado et al. |
| 5,834,824 A | 11/1998 | Shepherd et al. |
| 5,858,869 A | 1/1999 | Chen et al. |
| 5,866,204 A | 2/1999 | Robbie et al. |
| 5,900,652 A | 5/1999 | Battaglia et al. |
| 5,903,041 A | 5/1999 | La Fleur et al. |
| 5,953,625 A | 9/1999 | Bang |
| 5,962,910 A | 10/1999 | Hawley et al. |
| 5,969,983 A | 10/1999 | Thakur et al. |
| 5,973,380 A | 10/1999 | Cutter et al. |
| 5,994,776 A | 11/1999 | Fang et al. |
| 5,999,308 A | 12/1999 | Nelson et al. |
| 6,013,970 A | 1/2000 | Nishiwaki et al. |
| 6,016,000 A | 1/2000 | Moslehi |
| 6,016,001 A | 1/2000 | Sanchez et al. |
| 6,057,224 A | 5/2000 | Bothra |
| 6,069,064 A | 5/2000 | Cutter et al. |
| 6,077,792 A | 6/2000 | Farrar |
| 6,084,814 A | 7/2000 | Casper et al. |
| 6,088,282 A | 7/2000 | Loughmiller et al. |
| 6,097,077 A | 8/2000 | Gordon et al. |
| 6,113,758 A | 9/2000 | De Nora et al. |
| 6,146,925 A | 11/2000 | Dennison |
| 6,150,724 A | 11/2000 | Wenzel et al. |
| 6,185,144 B1 | 2/2001 | Suzuki |
| 6,202,065 B1 | 3/2001 | Wills |
| 6,206,065 B1 | 3/2001 | Robbie et al. |
| 6,228,694 B1 | 5/2001 | Doyle et al. |
| 6,239,187 B1 | 5/2001 | Hatke et al. |
| 6,243,299 B1 | 6/2001 | Rinerson et al. |
| 6,248,422 B1 | 6/2001 | Robbie et al. |
| 6,252,293 B1 | 6/2001 | Seyyedi et al. |
| 6,255,156 B1 | 7/2001 | Forbes et al. |
| 6,277,728 B1 | 8/2001 | Ahn et al. |
| 6,284,675 B1 | 9/2001 | Jin et al. |
| 6,288,437 B1 | 9/2001 | Forbes et al. |
| 6,291,871 B1 | 9/2001 | Dennison |
| 6,323,536 B1 | 11/2001 | Cutter et al. |
| 6,344,373 B1 | 2/2002 | Bhattacharyya et al. |
| 6,351,425 B1 | 2/2002 | Porter |
| 6,383,924 B1 | 5/2002 | Farrar et al. |
| 6,387,824 B1 | 5/2002 | Aoi et al. |
| 6,423,582 B1 | 7/2002 | Fischer et al. |
| 6,444,558 B1 | 9/2002 | Cutter et al. |
| 6,448,157 B1 | 9/2002 | Okonogi et al. |
| 6,451,672 B1 | 9/2002 | Caruso et al. |
| 6,452,713 B1 | 9/2002 | White |
| 6,456,149 B2 | 9/2002 | Cutter et al. |
| 6,458,630 B1 | 10/2002 | Daubenspeck et al. |
| 6,465,873 B1 | 10/2002 | Gonzalez |
| 6,495,395 B2 | 12/2002 | Reinberg |
| 6,498,056 B1 | 12/2002 | Motsiff et al. |
| 6,509,623 B2 | 1/2003 | Zhao |
| 6,525,399 B2 | 2/2003 | Cutter et al. |
| 6,541,811 B2 | 4/2003 | Thakur et al. |
| 6,542,682 B2 | 4/2003 | Cotteverte et al. |
| 6,579,738 B2 | 6/2003 | Farrar et al. |
| 6,582,512 B2 | 6/2003 | Geusic et al. |
| 6,589,334 B2 | 7/2003 | John et al. |
| 6,630,724 B1 | 10/2003 | Marr |
| 6,642,123 B2 | 11/2003 | Mun et al. |
| 6,656,822 B2 | 12/2003 | Doyle et al. |
| 6,657,277 B1 | 12/2003 | Hsieh |
| 6,674,667 B2 | 1/2004 | Forbes |
| 6,740,913 B2 | 5/2004 | Doyle et al. |
| 6,898,362 B2 | 5/2005 | Forbes et al. |
| 6,902,616 B1 | 6/2005 | Yamazaki et al. |
| 6,929,984 B2 | 8/2005 | Forbes et al. |
| 6,943,065 B2 | 9/2005 | Bhattacharyya et al. |
| 6,994,762 B2 | 2/2006 | Clingman et al. |
| 7,018,467 B2 | 3/2006 | Geusic et al. |
| 7,054,532 B2 | 5/2006 | Forbes et al. |
| 7,109,563 B2 | 9/2006 | Ahn et al. |
| 7,132,348 B2 | 11/2006 | Geusic et al. |
| 7,142,577 B2 * | 11/2006 | Geusic et al. ................... 372/99 |
| 7,326,597 B2 | 2/2008 | Forbes et al. |
| 7,485,942 B2 | 2/2009 | Ahn et al. |
| 7,544,984 B2 | 6/2009 | Forbes et al. |
| 7,550,824 B2 | 6/2009 | Geusic et al. |
| 7,564,082 B2 | 7/2009 | Forbes et al. |
| 2002/0062782 A1 | 5/2002 | Norris et al. |
| 2002/0070419 A1 | 6/2002 | Farrar et al. |
| 2002/0076896 A1 | 6/2002 | Farrar et al. |
| 2002/0175330 A1 | 11/2002 | Geusic et al. |
| 2002/0182837 A1 | 12/2002 | Daubenspeck et al. |
| 2003/0042534 A1 | 3/2003 | Bhattacharyya |
| 2003/0042627 A1 | 3/2003 | Farrar et al. |
| 2003/0071324 A1 | 4/2003 | Motsiff et al. |
| 2003/0075438 A1 | 4/2003 | Dalmia et al. |
| 2003/0131782 A1 | 7/2003 | Geusic et al. |
| 2003/0133683 A1 | 7/2003 | Forbes et al. |
| 2003/0157780 A1 | 8/2003 | Farrar et al. |
| 2003/0181018 A1 | 9/2003 | Geusic et al. |
| 2003/0190796 A1 | 10/2003 | Geusic |
| 2004/0176483 A1 | 9/2004 | Geusic |
| 2004/0266220 A1 | 12/2004 | Ahn et al. |
| 2005/0017273 A1 | 1/2005 | Forbes et al. |
| 2005/0020094 A1 | 1/2005 | Forbes et al. |
| 2005/0023638 A1 | 2/2005 | Bhattacharyya et al. |
| 2005/0029683 A1 | 2/2005 | Forbes et al. |
| 2005/0070036 A1 | 3/2005 | Geusic et al. |
| 2005/0105869 A1 | 5/2005 | Forbes et al. |
| 2005/0250274 A1 | 11/2005 | Forbes et al. |
| 2006/0208335 A1 | 9/2006 | Ahn et al. |
| 2006/0244105 A1 | 11/2006 | Forbes et al. |
| 2007/0075401 A1 | 4/2007 | Forbes et al. |
| 2007/0080335 A1 | 4/2007 | Forbes et al. |
| 2009/0256243 A1 | 10/2009 | Geusic |

FOREIGN PATENT DOCUMENTS

| | | |
|---|---|---|
| JP | 04-304653 | 10/1992 |
| JP | 2001-093887 | 4/2001 |

OTHER PUBLICATIONS

Banhart, John , "On the road again: metal foams find favor", *Physics Today*, 55(7), (Jul. 2002),37-42.

Holland, Brian T., "Synthesis of Macroporous Mineral with Highly Ordered Three-Dimensional Arrays of Spheroidal Voids", *Science, 281*, (Jul. 24, 1998),538-540.

Jiang, P , "The Fabrication and Bandgap Engineering of Photonic Multilayers", *Advanced Materials*, 13(6), (Mar. 2001),389-393.

Joannopoulos, J D., "Photonic crystals : molding the flow of light", Princeton N. J. : *Princeton University Press*, (1995),6.

John, S , "Photonic bandgap formation and tunability in certain self-organizing systems", *Journal of Lightwave Technology*, 17(11), (Nov. 1999),1931-1943.

Johnson, S G., "Guided modes in photonic crystal slabs", *Physical Review B (Condensed Matter)*, 60(8), (Aug. 15, 1999),5751-8.

Jurczak, M , "SON (silicon on nothing)—a new device architecture for the ULSI era", *VLSI Technology, 1999. Digest of Technical Papers. 1999 Symposium on*, Jun. 14-16, 1999, 29-30.

Lin, Shawn Yu , "A three-dimensional optical photonic crystal", *Journal of Lightwave Technology*, 17(11), (Nov. 1999), 1944-1947.

Loo, Y L., et al., "Contact Printing With Nanometer Resolution", *Device Research Conference*, (Jun. 2002),149-150.

Lu, Y , "Three-Dimensional Photonic Crystals with Non-spherical Colloids as Building Blocks", *Advanced Materials*, 13(6), (Mar. 2001),415-420.

Mitsutake, K , "Theoretical Study on the Formation Process of Empty Space in Silicon (ESS)", *2000 International Conference on Solid State Devices and Materials*, (2000),198-199.

Mizushima, I., "Empty-space-in-silicon technique for fabricating a silicon-on-nothing structure", *Applied Physics Letters*, 77(20), American Institute of Physics, NY,(Nov. 13, 2000),3290-3292.

Nichols, F. A., et al., "Surface- (interface-) and volume-diffusion contributions to morphological changes driven by capillarity", *Transactions of the American Institute of Mining, Metallurgical and Petroleum Engineers*, 233(10), (1965),1840-8.

Sato, T., "Trench transformation technology using hydrogen annealing for realizing highly reliable device structure with thin dielectric films", *1998 Symposium on VLSI Technology Digest of Technical Papers*, (1998),206-7.

Wijaranakula, W., et al., "Oxygen precipitation in p/p+(100) epitaxial silicon material", *Journal of the Electrochemical Society*, 134(9), SEH America, Inc., Mater. Characterization Lab., Vancouver, WA,(Sep. 1987),2310-16.

Yang, P., "Patterning Porous Oxides within Microchannel Networks", *Advanced Materials*, 13(6), (Mar. 2001),427-431.

Sato, T., et al., "SON (Silicon on Nothing) MOSFET using ESS (Empty Space in Silicon) technique for SoC applications", *IEDM Technical Digest. International Electron Devices Meeting*, (2001), 37.1.1-37.1.4.

"CRC handbook of chemistry and physics", *49th edition, CRC Press*, Cleveland, Ohio, (1968-1969), E-61.

Abelmann, L, et al., "Oblique evaporation and surface diffusion", *Thin Solid Films*305(1-2), (Aug. 15, 1997), 1-21.

Asoh, H, "Fabrication of ideally ordered anodic porous alumina with 63 nm hole periodicity using sulfuric acid", *Journal of Vacuum Science & Technology B (Microelectronics and Nanometer Structures)*, 19(2), (Mar. 2001), 569-72.

Beauvais, J, et al., "Nano-Imprint Lithography using Masks Fabricated by SiDWEL Process", Tenth Canadian Semiconductor Technology Conference Ottawa, Canada, (Aug. 13-17, 2001).

Bhattacharyya, A., "Physical & Electrical Characteristics of LPCVD Silicon Rich Nitride", *ECS Technical Digest, J. Electrochem. Soc.*, 131(11), 691 RDP, New Orleans, (1984), 469C.

Chou, S Y, et al., "Imprint lithography with sub-10 nm feature size and high throughput", *Microelectronic Engineering*, 35(1-4), (Feb. 1997), 237-40.

Chou, S Y, et al., "Sub-10 nm imprint lithography and applications", *Journal of Vacuum Science & Technology B (Microelectronics and Nanometer Structures)*, 15(6), (Nov.-Dec. 1997), 2897-904.

Colgan, M J, et al., "Field emission from carbon and silicon films with pillar microstructure", *Thin Solid Films*, 389(1-2), (Jun. 15, 2001), 1-4.

Das, B, et al., "Template Based Semiconductor Nanostructure Fabrication and their Applications", *Invited Paper, 11th International Workshop in the Physics of Semiconductor Devices*, (2001), D.1.1.

Devasahayam, A J, et al., "Material Properties of Ion Beam Deposited Oxides for the Opto-Electronic Industry", Tenth Canadian Semiconductor Technology Conference, Ottawa, Canada, (Aug. 13-17, 2001).

Jeng, Shin-Puu, et al., "A planarized multilevel interconnect scheme with embedded low-dielectric-constant polymers for sub-quarter-micron applications", *VLSI Technology, 1994. Digest of Technical Papers. 1994 Symposium on*, Jun. 7-9, 1994, 73-74.

Jin, C, "Evaluation of ultra-low-k dielectric materials for advanced interconnects", *Journal of Electronic Materials*, 30(4), (Apr. 2001), 284-9.

Karunasiri, R.P. U., et al., "Thin-film growth and the shadow instability", *Physical Review Letters*, 62(7), (Feb. 13, 1989), 788-91.

Kingery, W D, "Introduction to ceramics", New York, *Wiley*, (1963), 262-263.

Kittel, C A, "Introduction to Solid State Physics", *3rd Edition, J. Wiley & Sons*, (1966), 25.

Malac, Marak, et al., "Thin Films Deposited at Glancing Incidence and their Applications", *Vacuum Technology & Coating*, (Jul. 2001), 48-53.

Messier, R, et al., "Engineered sculptured nematic thin films [solid microstructures]", *Journal of Vacuum Science & Technology A (Vacuum, Surfaces, and Films)*, 15(4), (Jul.-Aug. 1997), 2148-52.

Morey, George W, "The properties of glass", Published New York, Reinhold publishing corporation, Series Monograph series (American Chemical Society); No. 77., (1938), 12, 48-49.

Pandya, D K, "Obliquely deposited amorphous Ge films. I. Growth and structure", *Journal of Applied Physics*, 46(7), (Jul. 1975), 2966-75.

Robbie, K, et al., "Sculptured thin films and glancing angle deposition: growth mechanics and applications", *Journal of Vacuum Science & Technology A (Vacuum, Surfaces, and Films)*, v 15, n 3, pt.2, (May-Jun. 1997), 1460-5.

Sato, T, "A new substrate engineering for the formation of empty space in silicon (ESS) induced by silicon surface migration", *International Electron Devices Meeting 1999. Technical Digest*, (1999), 517-20.

Tait, R N, et al., "Modelling and characterization of columnar growth in evaporated films", *Thin Solid Films*, 226(2), (Apr. 30, 1993), 196-201.

Thornton, T A, "High rate thick film growth", *Annual review of materials science*, vol. 7, (1977), 239-60.

Treichel, H, "Low dielectric constant materials", *Journal of Electronic Materials*, 30(4), (Apr. 2001), 290-8.

Wojcik, J, et al., "Characterization of Silicon Oxynitride Thin Films Deposited by ECR-PECVD", *Tenth Canadian Semiconductor Technology Conference*, Ottawa, Canada, (Aug. 13-17, 2001).

Wolf, S., *Silicon Processing for the VLSI Era —vol. 1: Process Technology, Second Edition*, Lattice Press, Sunset Beach, California, (2000), 719-727, 791-795.

Zhang, F, "Nanoglass/sup TM/ E copper damascene processing for etch, clean, and CMP", *Proceedings of the IEEE 2001 International Interconnect Technology Conference*, (2001), 57-9.

Ang, Kah Wee, "Enhanced performance in 50 nm N-MOSFETs with silicon-carbon source/drain regions", *IEEE International Electron Devices Meeting, 2004. IEDM Technical Digest.*, (Dec. 2004), 1069-1071.

Forbes, K Y, "Non-Volatile Memory Device with Tensile Strained Silicon Layer", U.S. Appl. No. 11/260,339 (client ref No. 05-0753—Letter file), 26 pgs, (Oct. 27, 2005).

Ghani, T., "A 90nm High Volume Manufacturing Logic Technology Featuring Novel 45nm Gate Length Strained Silicon CMOS Transistors", *Technical Digest IEEE International Electron Devices Meeting*, (Dec. 2003), 978-980.

Goto, K., "Technology Booster using Strain-Enhancing Laminated SiN (SELS) for 65nm Node Hp MPUs", *IEDM Technical Digest. IEEE International Electron Devices Meeting*, (Dec. 2004), 209-212.

Irie, H., et al., "In-plane mobility anisotropy and universality under uni-axial strains in n and p-MOS inversion layers on (100), [110], and (111) Si", *IEEE International Electron Devices Meeting, 2004. IEDM Technical Digest.*, (Dec. 2004), 225-228.

Komoda, T., "Mobility Improvement for 45nm Node by Combination of Optimized Stress Control and Channel Orientation Design", *IEEE International Electron Devices Meeting, 2004. IEDM Technical Digest.*, (Dec. 2004), 217-220.

Maikap, S., "Package-strain-enhanced device and circuit performance", *IEEE International Electron Devices Meeting, 2004. IEDM Technical Digest.*, (Dec. 2004), 233-236.

Pidin, S., "A Novel Strain Enhanced CMOS Architecture Using Selectively Deposited High Tensile and High Compressive Silicon Nitride Films", *IEEE International Electron Devices Meeting, 2004. IEDM Technical Digest.*, (Dec. 2004), 213-216.

Thompson, S. E., "Key Differences for Process-induced Uniaxial vs. Substrate-induced Biaxial Stressed Si and Ge Channel MOSFETs", *IEEE International Electron Devices Meeting, 2004. IEDM Technical Digest.*, (Dec. 2004), 221-224.

Wolf, S., et al., "Silicon Processing for the VLSI ERA", *IATTICE pRESS*, 1, (1986), 280-286.

\* cited by examiner

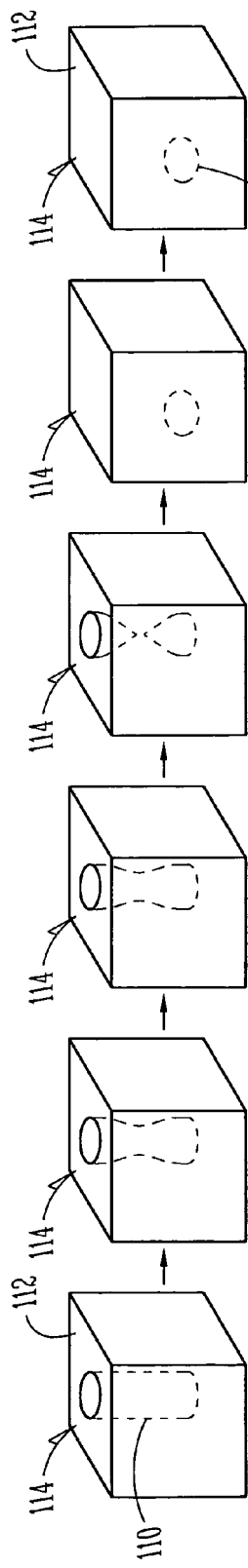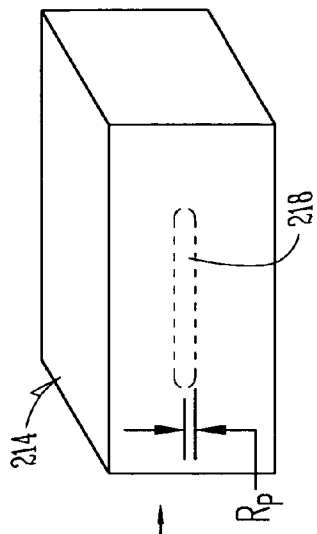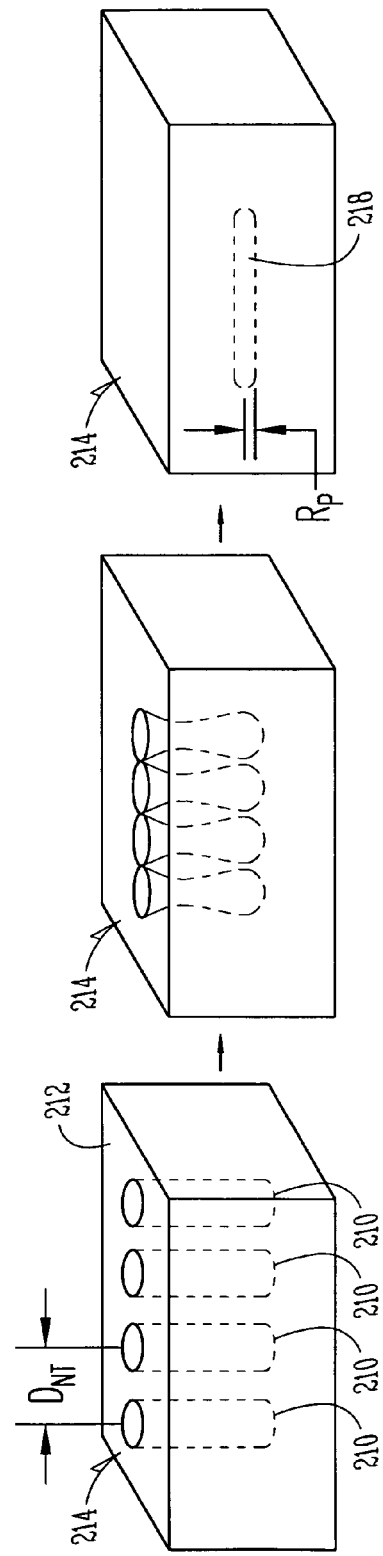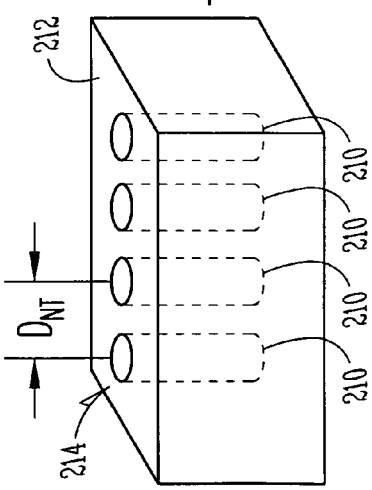

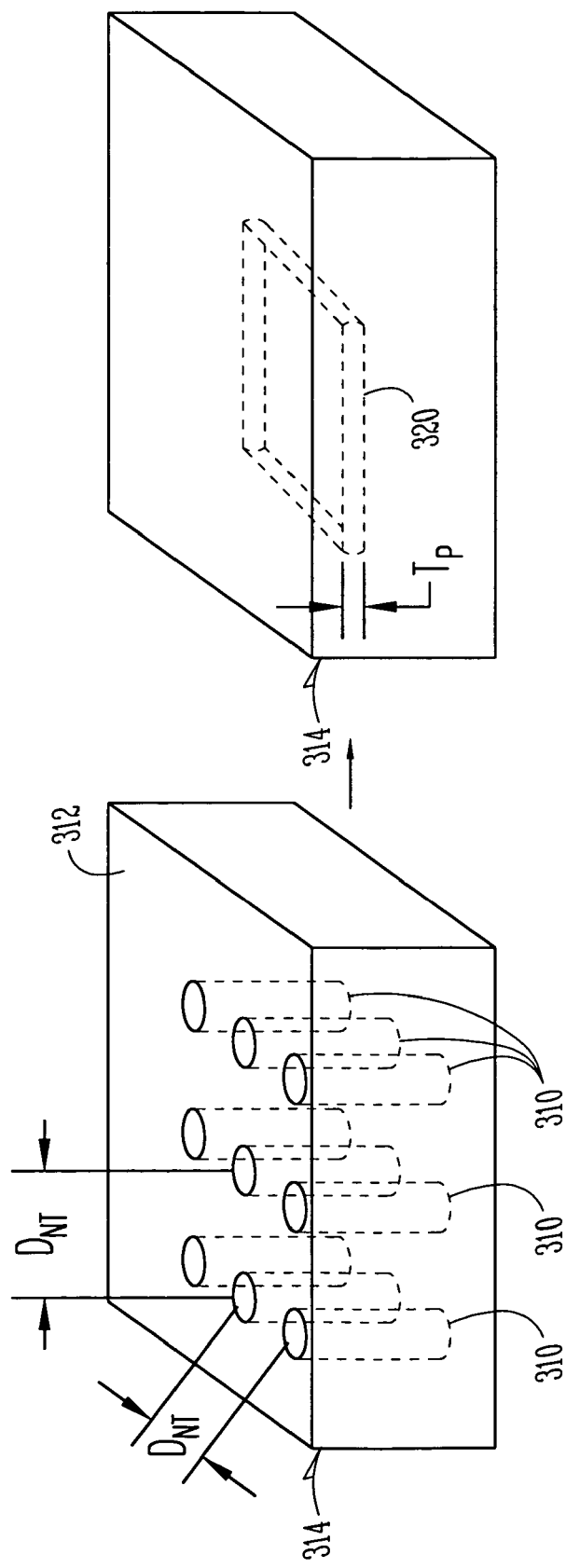

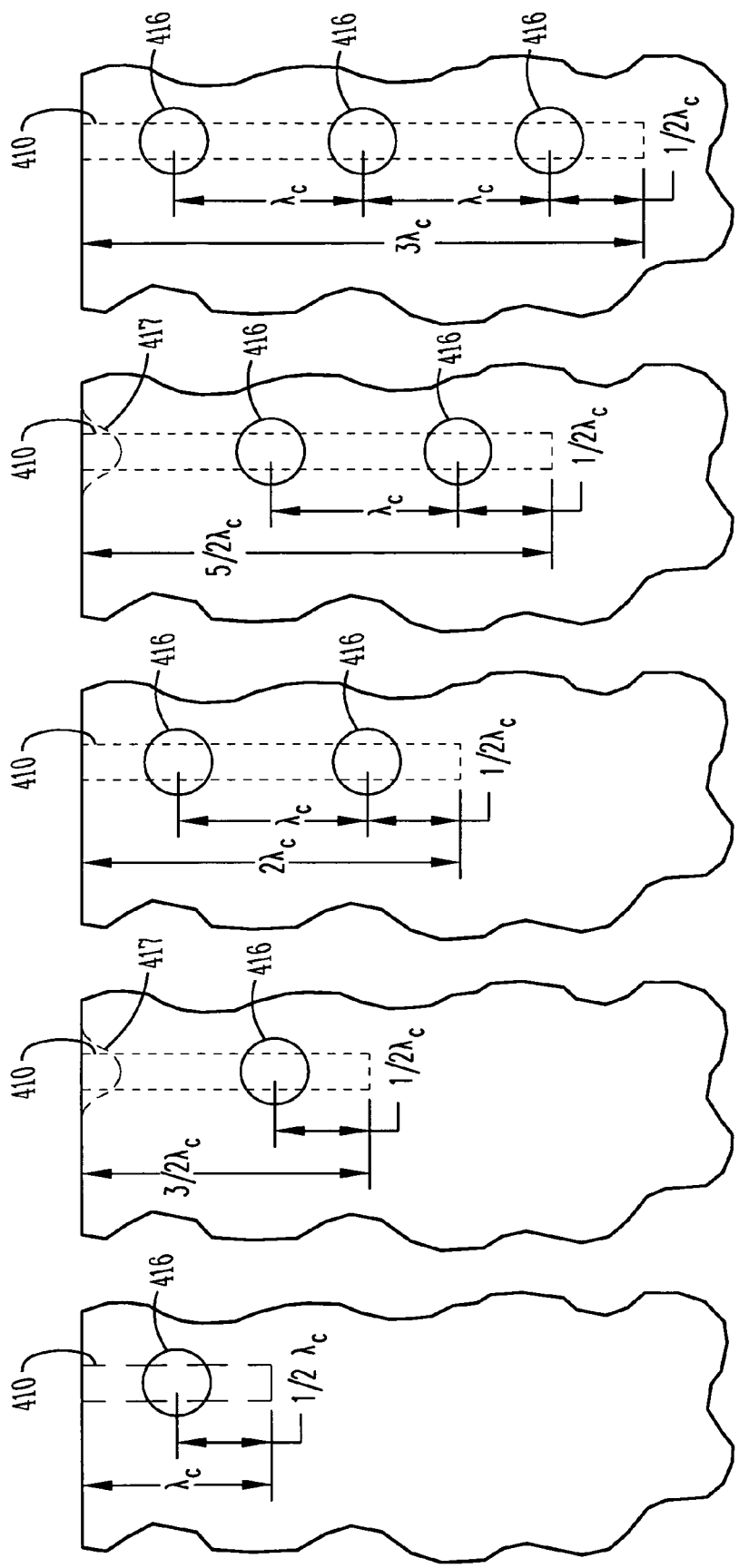

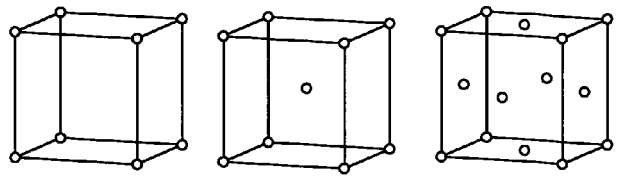
CUBIC P   CUBIC I   CUBIC F
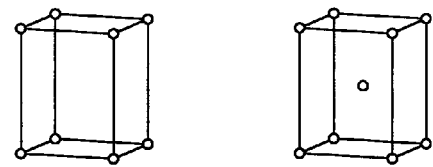
TETRAGONAL P   TETRAGONAL I
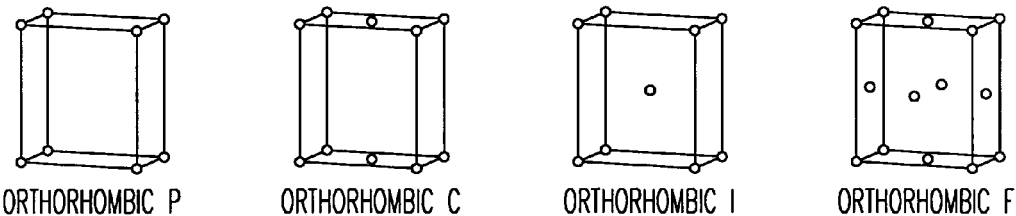
ORTHORHOMBIC P   ORTHORHOMBIC C   ORTHORHOMBIC I   ORTHORHOMBIC F
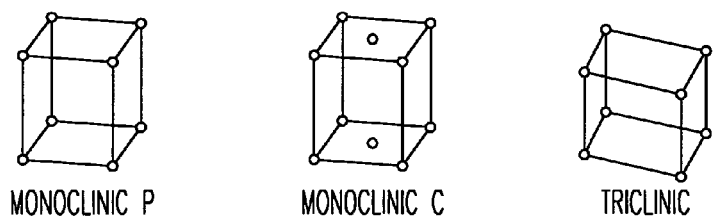
MONOCLINIC P   MONOCLINIC C   TRICLINIC
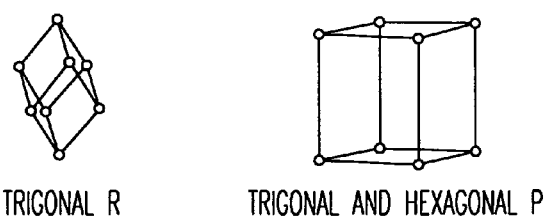
TRIGONAL R   TRIGONAL AND HEXAGONAL P
*Fig. 6*

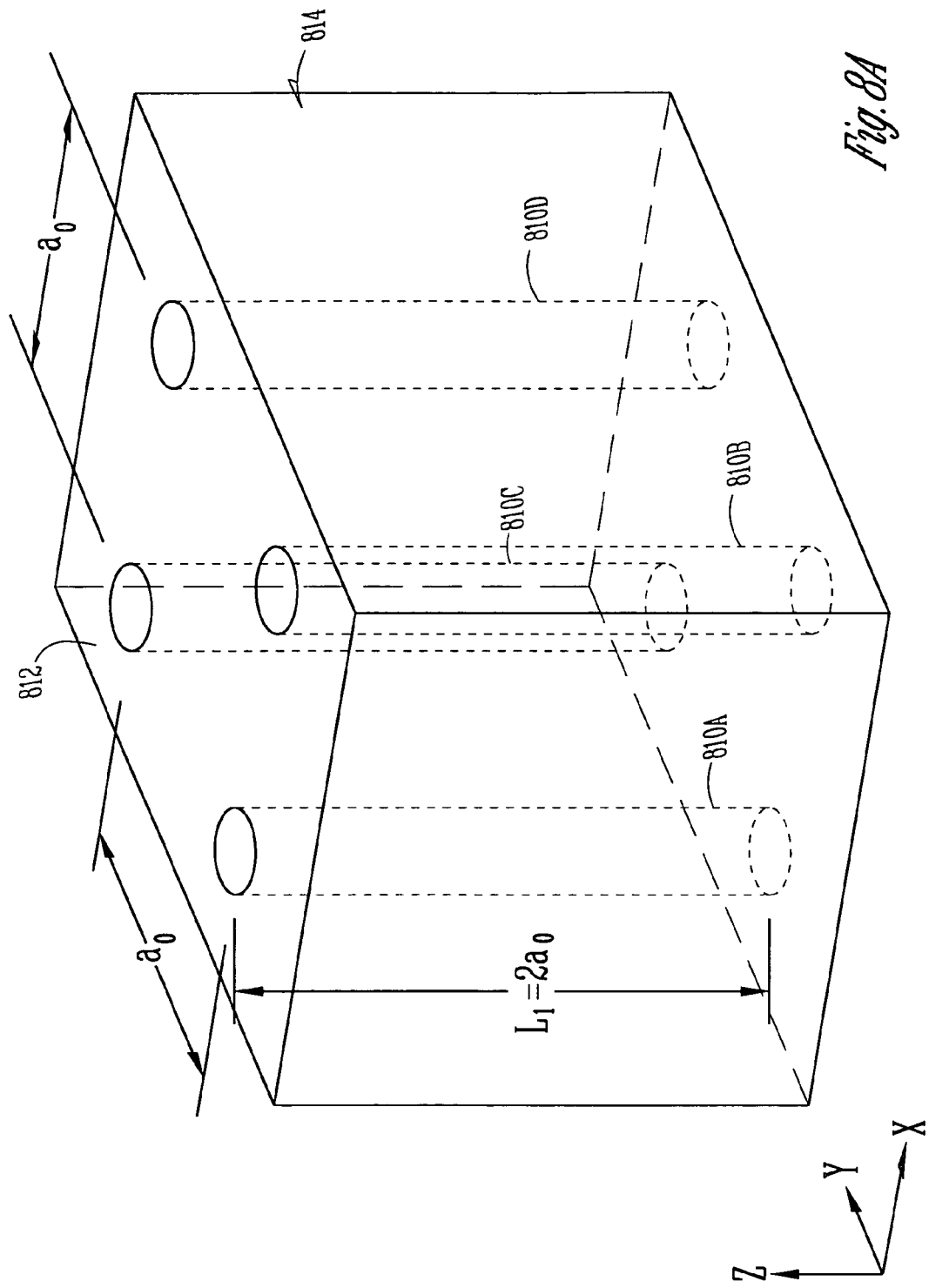

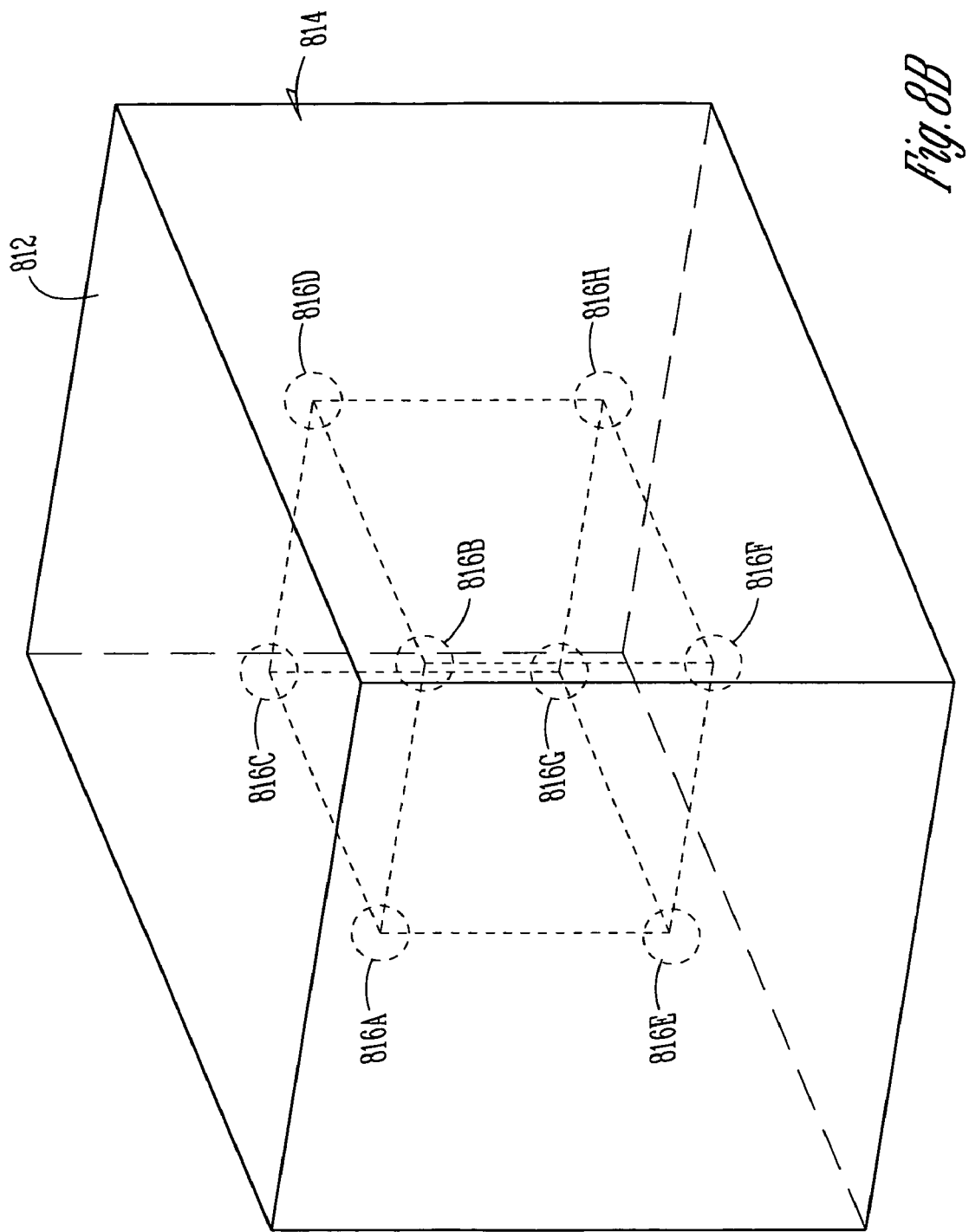

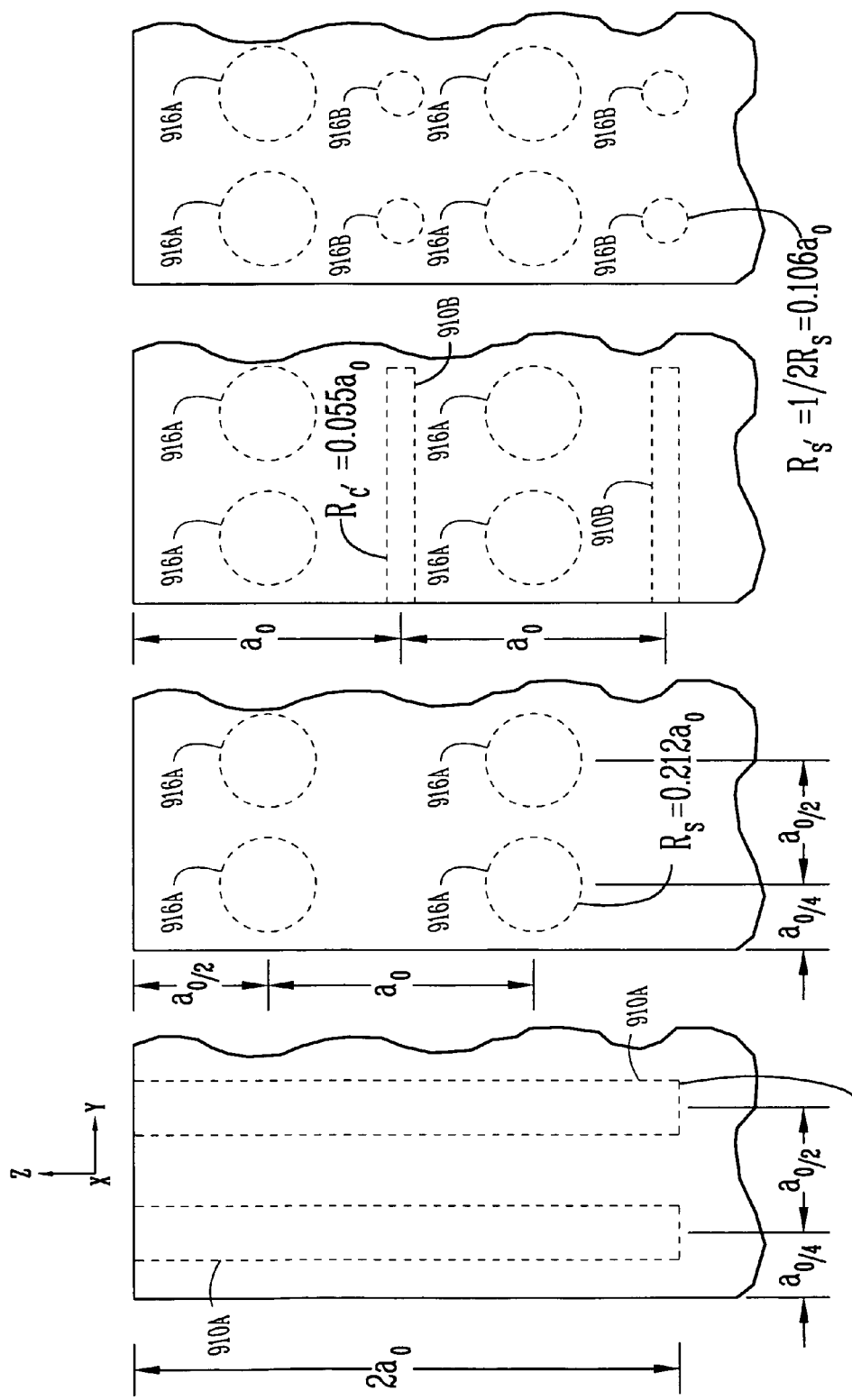

METHOD OF FORMING CELLULAR MATERIAL

CROSS REFERENCE TO RELATED APPLICATIONS

This application is a continuation application of application Ser. No. 10/382,246, filed on Mar. 5, 2003 now abandoned, and a continuation-in-part of application Ser. No. 11/005,712, filed on Dec. 7, 2004, now issued as U.S. Pat. No. 7,054,532, which is a continuation application of application Ser. No. 10/052,952, filed on Jan. 17, 2002, now U.S. Pat. No. 6,898,362. The '952 application was incorporated by reference in its entirety in the '246 application.

This application is related to the following commonly assigned U.S. patent applications which are herein incorporated by reference in their entirety: "Method Of Forming Buried Conductor Patterns By Surface Transformation Of Empty Spaces In Solid State Materials," Ser. No. 09/734,547, filed on Dec. 13, 2000; "Method Of Forming Mirrors By Surface Transformation Of Empty Spaces In Solid State Materials," Ser. No. 09/855,532, filed on May 16, 2001; "Three-Dimensional Complete Bandgap Photonic Crystal Formed By Crystal Modification," Ser. No. 10/053,003, filed on Jan. 17, 2002; "Low K Interconnect Dielectric Using Surface Transformation," Ser. No. 10/106,915, filed on Mar. 25, 2002; and "Method Of Forming Spatial Regions Of A Second Material In A First Material," Ser. No. 10/118,350, filed on Apr. 9, 2002.

TECHNICAL FIELD

The present subject matter relates generally to cellular materials and, more particularly, to cellular materials having a precisely-determined arrangement of voids formed using surface transformation.

BACKGROUND

It has been proposed to use cellular materials for a wide range of structural, mechanical and thermal applications using both metal and non-metal materials. These cellular materials include spaces or voids embedded within a solid.

Cellular materials provide interesting combinations of physical and mechanical properties. One advantage provided by cellular materials involves light-weight construction. For example, cellular materials are capable of realizing a higher stiffness and a lower density for a given weight.

The relationship between the stiffness (S) of a flat panel, the Young's modulus (E) of the panel material (representing the ability of the panel material to resist elastic strain), and the thickness (h) of the panel can be represented by:

$$S \propto E \times h^3. \quad (1)$$

Assuming that the panel maintains a constant footprint area and a constant weight, the relationship of the density ($\rho$) and the thickness (h) of the panel can be represented by:

$$h \propto \frac{1}{\rho}. \quad (2)$$

Substituting Equation No. 2 for h in Equation No. 1 results in Equation No. 3.

$$S \propto \frac{E}{\rho^3}. \quad (3)$$

Cellular material that has imperfections such as the lack of uniformity and closure of the voids can be characterized by the following experimentally-found exponential relationship between the Young's modulus (E) and density ($\rho$).

$$E \propto \rho^2. \quad (4)$$

Substituting Equation No. 4 for E in Equation No. 3 results in Equation No. 5.

$$S \propto \frac{1}{\rho}. \quad (5)$$

The following observations can be made for panels constructed of imperfect cellular material (i.e. material with non-uniform voids and/or lack of closure of voids). For a panel of a given footprint area and a given weight, constructing the panel to be twice as thick (2 h) (Equation No. 2) using imperfect cellular material half as dense ($\rho/2$) results in a panel that is twice as stiff (2S) (Equation No. 5). For a panel of a given footprint area, constructing the panel to be half as thick (h/2) using imperfect cellular material half as dense ($\rho/2$) results in a panel that maintains a given stiffness (S) and that is half the weight. Thus, imperfect cellular material provides certain benefits related to the relationship between density and stiffness as provided by Equation No. 5.

A perfect cellular material with uniform and closed voids is expected to provide a linear relationship between the Young's modulus (E) and the density ($\rho$), as represented by Equation No. 6.

$$E \propto \rho. \quad (6)$$

Substituting Equation No. 6 for E in Equation No. 3 results in Equation No. 7.

$$S \propto \frac{1}{\rho^2}. \quad (7)$$

The relationship between the stiffness (S) and density ($\rho$) as expressed in Equation No. 7 is expected to be approached when the voids in the cellular material become more uniformly spaced and when a majority of the voids in the cellular material are closed voids.

The following observations can be made for panels constructed of material that approaches a perfect or ideal cellular material (material with uniform voids and closure of voids). For a panel of a given footprint area and a given weight, constructing the panel to be twice as thick (2 h) (Equation No. 2) using perfect cellular material half as dense ($\rho/2$) is expected to result in a panel that is four times as stiff (4S) (Equation No. 7). For a panel constructed of a given footprint area, constructing the panel to be one fourth as thick (h/4) using perfect cellular material half as dense ($\rho/2$) is expected to result in a panel that maintains a given stiffness (S) and that is ¼ of the weight. Thus, it is desirable to form cellular materials with uniform and closed voids.

SUMMARY

The above mentioned problems are addressed by the present subject matter and will be understood by reading and studying the following specification. The present subject matter provides cellular materials with precisely determined arrangement of voids using surface transformation. In various embodiments, the cellular materials are suitable for use in various structural, mechanical and/or thermal applications.

In various embodiments, the precisely-determined arrangement of voids provides the cellular material with voids that are more uniformly spaced and with a majority of voids that are closed voids such that a relationship between stiffness (S) and density (ρ) for the cellular material approaches that of a perfect cellular material ($S \propto \rho^{-2}$). In various embodiments, the precisely-determined arrangement of voids provides the cellular material with a predictable mechanical failure for a given force. In various embodiments, the precisely-determined arrangement of voids provides the cellular material with an anisotropic stiffness.

One aspect of the present subject matter is a method of forming cellular material. According to various embodiments of the method, a predetermined arrangement of the plurality of holes is formed in a volume of material through a surface of the volume of material. The volume of material is annealed such that the volume of material undergoes a surface transformation in which the arrangement of the plurality of holes is transformed into a predetermined arrangement of at least one empty space below the surface of the volume of material.

One aspect of the present subject matter is a structure of cellular material. According to various embodiments, the structure includes a solid structure of material having a well-defined melting temperature and a well-defined annealing temperature below the melting temperature suitable to perform a surface transformation process. The structure further includes a precisely-determined arrangement of a plurality of voids formed within the solid structure. The plurality of voids is separated by a critical length ($\lambda_C$) that is dependent on the radius ($R_C$) of a number of holes used to form the plurality of voids using the surface transformation process. In various embodiments, a majority of the precisely-determined arrangement of the plurality of voids within the solid structure are closed and approximately uniformly spaced to provide the structure of cellular material with a uniform density. In various embodiments, the precisely-determined arrangement of the plurality of voids are arranged within the solid structure to provide the structure with a predictable mechanical failure for a given force.

These and other aspects, embodiments, advantages, and features will become apparent from the following description of the present subject matter and the referenced drawings.

BRIEF DESCRIPTION OF THE DRAWINGS

FIGS. 1A-1F illustrate a process to form cellular material with a sphere-shaped empty space, according to various embodiments of the present subject matter.

FIGS. 2A-2C illustrate a process to form cellular material with a pipe-shaped empty space, according to various embodiments of the present subject matter.

FIGS. 3A-3B illustrate a process to form cellular material with a plate-shaped empty space, according to various embodiments of the present subject matter.

FIGS. 4A-4E illustrate the formation of empty spheres from initial cylindrical holes with the same radii and with varying length.

FIG. 6 illustrates fourteen representative unit cells of space lattices which can be constructed according the present subject matter.

FIGS. 8A-8B illustrate a process for forming a cubic P lattice of spherical empty spaces according to the present subject matter.

FIG. 9A-9D illustrate a process for forming a simple illustrative structural unit of empty spheres having two radii.

DETAILED DESCRIPTION

Figure 5:
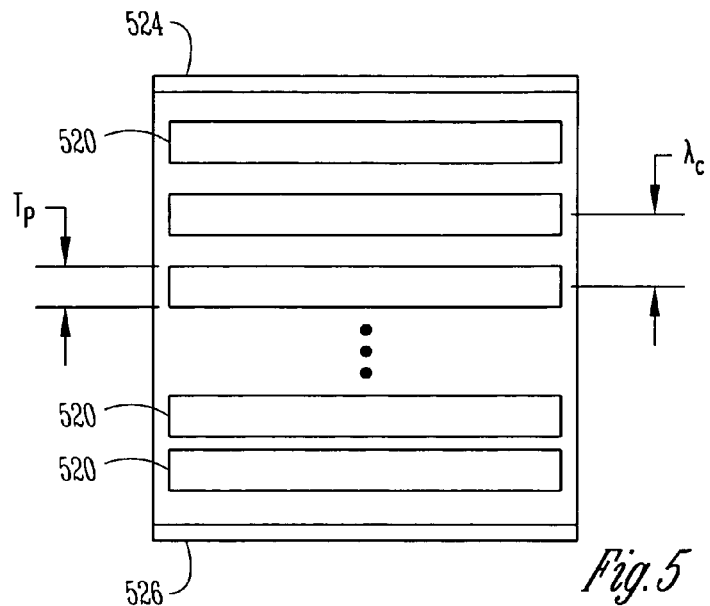
FIG. 5 illustrates a transformation formed stack of empty plates with a large filling factor or low density.

The following detailed description of the present subject matter refers to the accompanying drawings which show, by way of illustration, specific aspects and embodiments in which the present subject matter may be practiced. These embodiments are described in sufficient detail to enable those skilled in the art to practice the present subject matter. Other embodiments may be utilized. Structural and logical changes may be made without departing from the scope of the present subject matter. The following detailed description is, therefore, not to be taken in a limiting sense, and the scope of the present subject matter is defined only by the appended claims, along with the full scope of equivalents to which such claims are entitled.

The present subject matter provides a cellular material with a precisely-determined arrangement of voids (also referred to herein as empty spaces) using a surface transformation process. The volume of solid in which the voids are formed has a well-defined melting temperature. The solid is annealed in a temperature range below and near the melting temperature to transform a predetermined arrangement of holes through a surface of the volume into the desired predetermined arrangement of voids. These cellular materials are capable of being engineered for various structural and mechanical applications.

In various embodiments, the precisely-determined arrangement of voids provides the cellular material with voids that are more uniformly spaced and with a majority of voids that are closed voids such that a relationship between stiffness (S) and density (ρ) for the cellular material approaches the relationship for a perfect cellular material ($S \propto \rho^{-2}$). The uniformity, density, and space symmetry of the cellular material is precisely determined by controlling the diameter, depth and position of an initial arrangement of cylindrical holes formed through a surface of a solid. In various embodiments, the holes have a generally-elongated shape extending into the volume away from the surface. In various embodiments, the holes have a generally cylindrical shape. The present subject matter is not so limited, however.

In various embodiments, the precisely-determined arrangement of voids provides the cellular material with a predictable mechanical failure for a given force. In various embodiments, the precisely-determined arrangement of voids provides the cellular material with an anisotropic stiffness.

When a solid is heated to a higher temperature, a solid with a hole that is beyond a critical length ($\lambda_c$) becomes unstable. For the purposes of the analysis provided below, the holes are referred to as cylindrical holes. Upon reading and comprehending this disclosure, one of ordinary skill in the art will understand that holes which are not geometrically cylindrical can be used in a surface transformation process, and further will understand how to form a predetermined arrangement of voids using holes that are not geometrically cylindrical.

The cylindrical hole is transformed into one or more empty spheres formed along the cylinder axis. The number (N) of spheres formed depends on the length (L) and radius ($R_C$) of the cylinder. Two models of diffusion are the surface diffusion model and the pure volume diffusion model. With respect to the surface diffusion model, for example, the relation between the cylinder length (L), cylinder radius ($R_C$), and number of spheres (N) is expressed by the following equation:

$$8.89 \times R_C \times N \leq L < 8.89 \times R_C \times (N+1). \qquad (1)$$

Equation (1) predicts that no empty spheres will form if $L < 8.89 \times R_C$. Each empty sphere that forms has a radius ($R_S$) expressed by the following equation:

$$R_S = 1.88 \times R_C. \qquad (2)$$

If the cylinder has sufficient length L to form two spheres, the center-to-center spacing between the spheres corresponds to the critical length ($\lambda_C$) and is provided by the equation:

$$\lambda_C = 8.89 \times R_C. \qquad (3)$$

The pure volume diffusion model provides similar results, with slightly different constants. For example, depending on the exact magnitude of the diffusion parameters, $\lambda_C$ can vary from $9.02 \times R_R$ to $12.96 \times R_R$. One of ordinary skill in the art will understand, upon reading and understanding this disclosure, that the diffusion model is capable of being determined by experiment. The remainder of this disclosure uses the surface diffusion model. One of ordinary skill in the art will understand, upon reading and comprehending this disclosure, how to apply this disclosure to another diffusion model.

Various shaped empty spaces or voids such as sphere-shaped voids, pipe-shaped voids, and plate-shaped voids are capable of being formed under the surface of a volume of material with a well-defined melting temperature. The shape of the empty spaces formed during the annealing conditions depends on the size, number and spacing of the cylindrical holes that are initially formed at a lower temperature.

Various predetermined arrangements of empty spaces or voids are capable of being formed under the surface of a volume of material with a well-defined melting temperature. For example, an appropriately-sized deep trench in a material with a well-defined melting temperature is transformed into empty spheres along the axis of the original trench at an annealing temperature within a predetermined a range below the melting temperature. The empty spheres are uniformly sized and spaced. Other predetermined arrangements are provided below.

FIGS. 1A-1F illustrate a process to form cellular material with a sphere-shaped empty space, according to various embodiments of the present subject matter. A cylindrical hole 110 is formed through the surface 112 of a volume of a solid material 114. As used here, the term hole refers to a void that extends from a surface of the volume into the solid material and that is defined by the solid material. The material 114 is heated (annealed) and undergoes the transformation illustrated in FIGS. 1B through 1F. One of ordinary skill in the art would understand, upon reading and comprehending this disclosure, that the desired annealing temperature is dependent on the well-defined melting temperature of the material. The result of the surface transformation process is an empty sphere formed below the surface 112 of the volume of material 114.

In order to form a single sphere, which holds true for forming a single pipe (FIGS. 2A-2C) or plate (FIGS. 3A-3B), the length (L) and radius ($R_C$) of the cylindrical holes are chosen such that equation (1) with N=1 is satisfied. A vertical stacking of N empty spaces results if the length of the cylindrical holes is such that equation (1) is satisfied.

In order for single surface-transformed spheres to combine with other surface-transformed spheres, the center-to-center spacing ($D_{NT}$) between the initial cylindrical holes will satisfy the following equation:

$$2 \times R_C < D_{NT} < 3.76 \times R_C. \qquad (4)$$

Satisfying this equation prevents the adjacent initial cylindrical holes from touching, yet allows the adjacent surface-transformed spheres to combine and form pipe and plate empty spaces, as shown in FIGS. 2A-2C and FIGS. 3A-3B and described below.

FIGS. 2A-2C illustrate a process to form cellular material with a pipe-shaped empty space, according to various embodiments of the present subject matter. A linear array of cylindrical holes 210 is formed in a surface 212 of a solid material 214. The cylindrical holes 210 have a center-to-center spacing ($D_{NT}$) as calculated using equation (4). The material 214 is heated (annealed) and undergoes the transformation illustrated in FIGS. 2B through 2C. The result of the surface transformation process is an empty pipe-shaped void 218 formed below the surface 212 of the volume of material 214. The radius ($R_P$) of the pipe 218 is provided by the following equation:

$$R_P = \sqrt{\frac{8.86 \times R_C^3}{D_{NT}}}. \qquad (5)$$

FIGS. 3A-3B illustrate a process to form cellular material with a plate-shaped empty space, according to various embodiments of the present subject matter. A two-dimensional array of cylindrical holes 310 is formed in a surface 312 of a solid material 314. The cylindrical holes 310 have a center-to-center spacing ($D_{NT}$) as calculated using equation (4). The material 314 is heated (annealed) and undergoes the transformation illustrated in FIG. 3B. The result of the surface transformation process is an empty plate-shaped void 320 formed below the surface 312 of the volume of material 314. The thickness ($T_P$) of a plate 320 is given by the following equation:

$$T_P = \frac{27.83 \times R_C^3}{D_{NT}^2}. \qquad (6)$$

The present subject matter forms cellular material using surface transformation. In various embodiments, the present subject matter forms a precisely-determined arrangement of voids using surface transformation to provide a cellular material with a relationship between stiffness (S) and density ($\rho$) approaching that of a perfect cellular material ($S \propto \rho^{-2}$). In various embodiments, the present subject matter forms a precisely-determined arrangement of voids using surface transformation to provide a cellular material with a predictable mechanical failure for a given force. In various embodiments, the present subject matter forms a precisely-determined arrangement of voids using surface transformation to provide a cellular material with an anisotropic stiffness.

The size, shape and spacing of empty spaces is controlled by the diameter, depth and spacing of holes (or trenches) initially formed in a material that has a defined melting temperature. Empty spaces or voids are formed after annealing the material in a temperature range below and near the defined melting temperature. The empty spaces or voids are capable of being formed with a spherical shape, a pipe shape, plate shape, various combinations of these shape types, and/or various dimensions for the various shape type and combinations of shape type.

The volume of air incorporated in the surface transformed empty spaces is equal to the volume of air within the initial starting pattern of cylindrical holes. Thus, the surface transformed empty spaces do not cause additional stress in the material or a tendency for the material to crack.

The surface of the volume of material will be smooth after the surface transformed empty spaces are formed if the initial cylinder length (L) is equal to an integer of a critical length ($\lambda_c$) such as $1 \times \lambda_c$ to form one sphere, $2 \times \lambda_c$ to form two spheres, $3 \times \lambda_c$ to form three spheres, etc. If the cylinder length (L) is not equal to an integer of a critical length ($\lambda_c$), then the surface will have dimples caused by air in the cylinder attributable to the length beyond an integer of a critical length ($\lambda_c$). That is, for a given length L and $\lambda_c$, the number of spheres formed is the integer of $L/\lambda_c$, and the remainder of $L/\lambda_c$ contributes to the dimples on the surface.

FIGS. 4A-4E illustrate the formation of empty spheres from initial cylindrical holes with the same radii and with varying length. Initial cylindrical holes are represented using dashed lines 410. These initial cylindrical holes 410 have the same radius ($R_C$) and are drilled or otherwise formed to different depths as represented by FIGS. 4A, 4B, 4C, 4D and 4E. The resulting surface-transformed spheres 416 are illustrated with a solid line, as are the surface dimples 417 that form when the cylindrical hole depth is not an integer multiple of $\lambda_C$. These surface dimples can be removed using a simple polishing process to leave a smooth surface with uniform and closed spherical voids within the material. The vertical position and number of the spherical voids is determined by the depth of the initial cylindrical holes.

In various embodiments of the present subject matter, the cellular material is formed by appropriately spacing the holes such that, upon annealing the material to provide the surface transformation process, the voids are uniformly spaced (or approximately uniformly spaced) throughout the volume of the cellular material. The uniformly spaced voids provide the cellular material with a uniform density from a macroscopic level.

In various embodiments, a cellular material is designed to have a predetermined mechanical failure at a predetermined site for a given force by forming the voids with a predetermined shape, a predetermined size, and/or a predetermined arrangement. Thus, in various embodiments where the cellular material is incorporated into a mechanism, certain components of the mechanism are formed with cellular material that has been designed to fail in a predictable site and for a predictable force to protect other components of the mechanism such as a shear pin to protect a motor and the like. The components designed to fail are cheaper and/or more easily replaced than the components protected by the components designed to fail. In various embodiments where the cellular material is incorporated into a case, chassis or shell of a device, for example, the case, chassis or shell can be designed to withstand certain forces and to absorb certain forces either isotropically or anisotropically. In various embodiments, for example, the cellular material is incorporated into the case of a portable device (such as a laptop computer, portable phone, or personal digital assistant (PDA) and the like) to reduce the weight of the device, maintain or increase the stiffness of the case, and absorb certain forces (such as a fall and the like) from damaging the electronic components.

In various embodiments, it is desirable to provide a cellular material with a very low density within appropriate constraints for the ability to withstand various strain forces. FIG. 5 illustrates a transformation formed stack of empty plates with a large filling factor or low density. For example, the illustrated filling factor is approximately equal to 0.78, which provides a relatively high porosity and a relatively low density. In the illustrated example, the surface transformation produces a vertical stack of empty plates in the materials. The number of empty plates formed depends on the length of the holes. From equation (6), it is determined that the thickness $T_P$ of the empty plate has a maximum value of $6.95 \times R_C$ when $D_{NT}$ is near the minimum allowed value of $2 \times R_C$ as inferred from equation (4). From equation (3), the center-to-center spacing ($\lambda$) of empty plates is $8.89 \times R_C$. It can be calculated that $f \approx 0.78$. Thus, it is expected to be able to use surface transformation to form cellular material with a density of less than one fourth that of a solid volume of material.

In various embodiments of the present subject matter, a plurality of space group symmetries of empty spheres of equal size are formed in a solid material.

FIG. 6 illustrates fourteen representative unit cells of space lattices which can be constructed according the present subject matter. For simplicity, only the cubic P unit cell of FIG. 6 with a lattice constant "$a_0$" is explained. One of ordinary skill in the art will understand, upon reading and comprehending this disclosure, how to form the other unit cells illustrated in FIG. 6.

Figure 7:
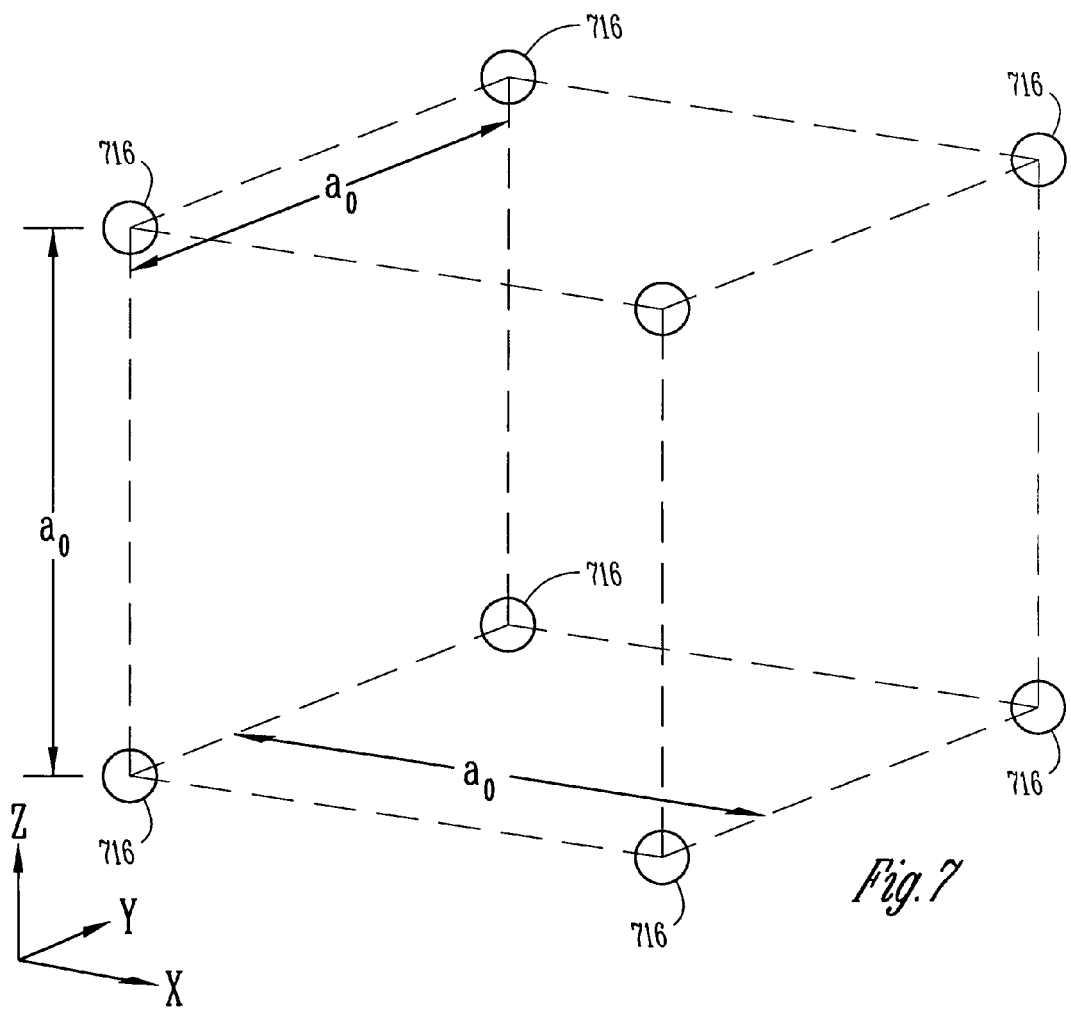
FIG. 7 illustrates the cubic P unit cell shown among the fourteen representative unit cells of FIG. 6.

FIG. 7 illustrates the cubic P unit cell shown among the fourteen representative unit cells of FIG. 6. A defined set of cylindrical holes are drilled or otherwise formed into the solid material to form empty spheres 716 of the same radius in the solid material at each of the illustrated unit cell lattice positions. For simplicity, the formation of one unit cell in the x-y plane and n unit cells in the z direction is discussed. Additional unit cells in the x-y planes are formed by repeatedly translating the hole pattern for the unit cell in the x and y directions. From equations (2) and (3), spheres are created with periodicity $a_0$ in the Z direction by drilling or otherwise forming the holes in the Z direction such that the radius of the holes ($R_C$) are represented by the following equation:

$$R_C = \frac{a_0}{8.89} \approx 0.11 \times a_0. \tag{7}$$

After surface transformation, the radius, $R_S$ of each formed empty sphere is:

$$R_S = \frac{1.88}{8.89} \times a_0 \approx 0.212 \times a_0. \tag{8}$$

In order to form n unit cells in the Z direction through surface transformation, the depth ($L_n$) of the initial cylinder in the Z direction is:

$$L_n = (n+1) \times a_0 = (n+1) \times 8.99 \times R_C. \tag{9}$$

To form a single cubic P unit cell in the Z direction, n is set to 1 for the two deep arrangement of spheres such that the cylindrical holes are formed to the following hole depth:

$$L_1 = 2 \times 8.89 \times R_C = 2 \times a_0. \tag{10}$$

FIGS. 8A-8B illustrate a process for forming a cubic P lattice of spherical empty spaces according to the present subject matter. Referring to FIG. 8A, four cylindrical holes 810A, 810B, 810C and 810D of radius $R_C = 0.11 \times a_0$ are drilled or otherwise formed into the solid material 814 from an upper surface 812 to a depth $L = 2 \times a_0$. The four cylindrical holes 810A, 810B, 810C and 810D are spaced apart along the x and y axes at a distance $a_0$. The solid material is annealed near its melting temperature to form sphere-shaped empty spaces 816A, 816B, 816C, 816D, 816E, 816F, 816G and 816H by surface transformation at desired sites of the cubic P unit cell as is shown in FIG. 8B.

One of ordinary skill in the art will understand, upon reading and comprehending this disclosure, that the unit cells of each primitive lattice in FIG. 6 can be formed to have equal sized empty spheres at each lattice site by drilling or otherwise forming in the Z direction an appropriate pattern of cylindrical holes of the same diameter in the x-y plane. The prescribed depths for these unit cells will generally be different.

In various embodiments, space lattices having more than one size of empty spheres in the unit cell are formed by drilling or otherwise forming initial cylindrical holes of more than one radius. In various embodiments, the holes are formed in more than one direction. The number of surface transformation annealing steps used to form the space lattice depends on the structure to be formed. A method to form a simple illustrative structural unit of empty spheres is described below.

FIGS. 9A-9D illustrate a process for forming a simple illustrative structural unit of empty spheres having two radii. The desired structure has four empty spheres of radius $R_S = 0.212 \times a_0$, and four empty spheres of radius $R_S' = \frac{1}{2} \times R_S = 0.106 \times a_0$. All of the empty spheres have a closes center-to-center spacing of $a_0/2$. The process to form the above-described structure is illustrated in FIGS. 9A, 9B, 9C and 9D.

In FIG. 9A, two cylindrical holes 910A of radius, $R_C = 0.11 \times a_0$ and of length $L = 2 \times a_0$ are drilled or otherwise formed in the Z direction. The solid material is annealed to effect surface transformation and form the four spheres 916A with $R_S = 0.212 \times a_0$, as shown in FIG. 9B.

In FIG. 9C, two cylindrical holes 9101B are drilled in the y-direction. These holes 910B have a radius $R_C = 0.055\ a_0$, and a length $Z' = a_0$. Again the material is annealed to effect surface transformation and the four smaller empty spheres 916B to form the desired structure shown in FIG. 9D. The second annealing step only effects the cylindrical holes since they are not energetically stable. The four previously formed larger empty spheres are stable since they were formed during the first annealing.

Another method for forming the structure in FIG. 9D involves forming the cellular material in various deposition layers and forming the voids using a surface transformation process (i.e. hole formation and annealing) for each layer before a successive layer of material is deposited. Using this method, the structure illustrated in FIG. 9D is formed by a first deposition process, a first surface transformation process, a second deposition process, a second surface transformation process, a third deposition process, a third surface transformation process, a fourth deposition process, and a fourth surface transformation process. Each surface transformation step includes hole formation and annealing. For each layer, the hole formation pattern is calculated to achieve the desired spacing of resulting voids, both between and within layers, after the layer is annealed.

One of ordinary skill in the art will understand, upon reading and comprehending this disclosure, that a number of void arrangements are capable of being formed, a number of void sizes are capable of being formed, and that various combinations void arrangements and void sizes are capable of being formed. One of ordinary skill in the art will understand, upon reading and comprehending this disclosure, that various different shapes of empty spaces can be formed, and that these various different shapes of empty spaces can be combined with other shapes of empty spaces. For example, a cellular material can include a number of sphere-shaped voids, a number of pipe-shaped voids, a number of plate-shaped voids, and various combinations of sphere-shaped void(s), pipe-shaped void(s), and plate-shaped void(s). One of ordinary skill in the art will understand, upon reading and comprehending this disclosure, that the various shapes can be stacked, and that various different shapes can be stacked together. For example, an arrangement of spheres can be stacked on top of an arrangement of plates. Additionally, each stack of voids can include various shapes. The precisely-determined arrangement of empty spaces is determined by the position, depth and diameter of the holes formed prior to the annealing process.

The figures presented and described above are useful to illustrate method aspects of the present subject matter. Some of these method aspects are described below. The methods described below are nonexclusive as other methods may be understood from the specification and the figures described above. One aspect provides a method for forming cellular material.

Figure 10:
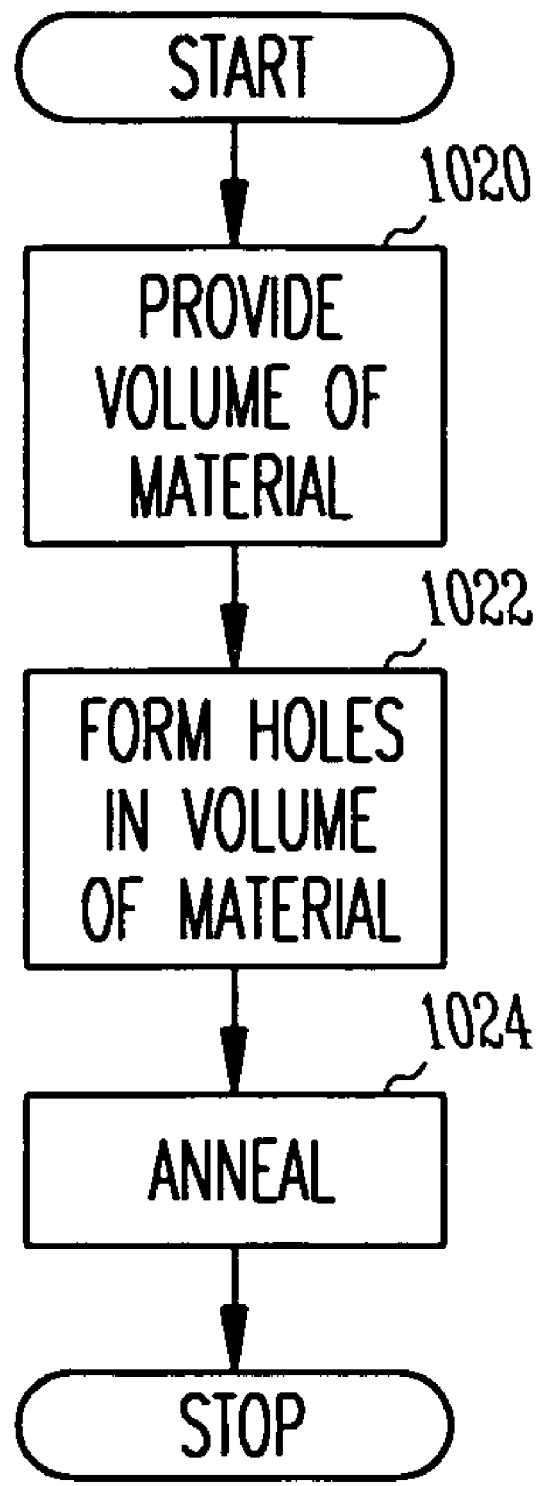
FIG. 10 illustrates a method for forming cellular material, according to various embodiments of the present subject matter.

FIG. 10 illustrates one embodiment for forming cellular material. According to various embodiment, a volume of material is formed or otherwise provided at 1020. Holes are formed in the volume of material at 1022. At 1024, the volume of material is annealed to cause surface transformation. The surface is heated rapidly to a temperature within a region below and near a well-defined melting point of the material to transform the holes into buried empty spaces. The result of the surface transformation is that the holes that were previously formed in the volume of material are transformed into empty spaces under the surface of the volume. These empty spaces lower the density of the volume of material and increase the stiffness of the material. In various embodiments, the use of the surface transformation technique allows the precisely-determined arrangement of spaces to be arranged in such a manner as to maximize the amount of void space. In various embodiments, the use of the surface transformation technique allows the precisely-determined arrangement of spaces to be uniformly spaced and closed. In various embodiments, the use of the surface transformation technique allows the precisely-determined arrangement of spaces to provide cellular material with a predictable mechanical failure for a given force.

The cellular material of the present subject matter is capable of being used in a wide range of structural, mechanical and thermal applications. A few applications are provided below. These applications are not intended to be an exclusive listing of all the applications for the cellular material of the present subject matter.

One application involves light-weight construction. The cellular material of the present subject matter possesses a desirable relationship between stiffness (S) and density ($\rho$) which allows lighter weight materials to perform the same mechanical functions. This characteristic is desirable in the transportation industry such as automobiles, trucks, trains, airplanes, ships, and the like. This characteristic is also desirable for portable items such as such as suitcases, laptop computers, PDAs, cell phones, briefcases, and the like. This characteristic is also desirable for eyeglasses, and various sporting equipment. This characteristic is also desirable for products in general to reduce the costs associated with shipping and assembly.

One application involves crash absorption. Crash absorption is desirable for vehicle safety. For example, various embodiments incorporate the cellular material into easily replaced crash boxed designed to safely absorb the force of a crash. Crash absorption is also desirable to protect and provide robustness for devices such as laptop computers, cell phones, video cameras, digital cameras etc. For example, various embodiments incorporate the cellular material of the present subject matter in an outer shell designed to absorb the force of a fall or other crash. Another example involves the use of breakaway parts that are designed to be easily and cheaply replaced, and that are designed to break to absorb a crash and protect other more expensive components.

One application involves anisotropic stiffness. For example, various embodiments incorporate cellular material with anisotropic stiffness into a package design such that the package is designed to be easily opened while still protecting the packaged articles from damage caused by falls and other accidental environmental elements.

The present subject matter provides the ability to form cellular material with a precisely-determined arrangement of voids using surface transformation. In various embodiments, the precisely-determined arrangement of voids include uniformly spaced and closed voids that provide the cellular material with a desirable relationship between density and stiffness. In various embodiments, the precisely-determined arrangement of voids provide the cellular material with a predictable mechanical failure.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present subject matter. It is to be understood that the above description is intended to be illustrative, and not restrictive. Combinations of the above embodiments, and other embodiments will be apparent to those of skill in the art upon reviewing the above description. The scope of the present subject matter includes any other applications in which the above structures and fabrication methods are used. The scope of the present subject matter should be determined with reference to the appended claims, along with the full scope of equivalents to which such claims are entitled.

What is claimed is:

1. A method of forming cellular material, comprising:
engineering the cellular material for a structural application or for a mechanical application or for a thermal application, wherein engineering the cellular material includes determining a desired arrangement of at least one empty space to provide the cellular material with the desired structural properties for the structural application, or to provide the cellular material with the desired mechanical properties for the mechanical application, or to provide the cellular material with the desired thermal properties for the thermal application, wherein the desired arrangement for the at least one empty space includes a desired size and location for each of the at least one empty space;
performing a surface transformation process to form the desired arrangement of at least one empty space for the structural application, or for the mechanical application or for the thermal application, wherein performing the surface transformation process includes:
determining a desired arrangement for a plurality of holes through a surface of a volume of material, wherein the desired arrangement for the plurality of holes includes a location, diameter and depth for each of the plurality of holes control the size and location for each of the at least one empty space that results from the surface transformation process;
forming the desired arrangement of the plurality of holes in the volume of material through the surface of the volume of material; and
annealing the volume of material such that the volume of material undergoes a surface transformation to transform the arrangement of the plurality of holes into the desired arrangement of at least one empty space below the surface of the volume of material.

2. The method of claim 1, wherein the volume of material includes a material with a well-defined melting temperature, and annealing the volume of material includes annealing the volume of material at a temperature that is close to and below the well-defined melting temperature.

3. The method of claim 1, wherein forming the predetermined arrangement of the plurality of holes includes forming a predetermined arrangement of a plurality of cylindrical holes.

4. The method of claim 3, wherein forming the desired arrangement of the plurality of holes includes forming the plurality of cylindrical holes with a length that is approximately equal to an integer of a critical length ($\lambda_C$), the critical length being dependent on a radius ($R_C$) of the cylindrical hole.

5. The method of claim 1, wherein the volume of material includes a polymer.

6. The method of claim 1, wherein the volume of material includes a metal.

7. The method of claim 1, wherein the volume of material includes a metal oxide.

8. The method of claim 1, wherein the volume of material includes a ceramic.

9. The method of claim 1, wherein the volume of material includes a glass.

10. The method of claim 1, wherein:
determining the desired arrangement for the plurality of holes includes determining a desired spacing between the plurality of holes.

11. The method of claim 10, wherein determining the desired arrangement of at least one empty space includes determining the desired arrangement of a plurality of spaces to provide the volume of material with an approximately uniform density.

12. The method of claim 10, wherein determining the desired arrangement of at least one empty space includes determining the desired arrangement of a plurality of spaces to provide the volume of material with a predictable metal fatigue site.

13. The method of claim 10, wherein determining the desired arrangement of at least one empty space includes determining the desired arrangement of a plurality of spaces to provide the volume of material with a predictable deformation for a given force.

14. The method of claim 1, wherein the desired arrangement for the at least one empty space includes at least one empty pipe.

15. The method of claim 14, wherein the desired arrangement for the at least one empty space includes an arrangement of a plurality of empty pipes suitably spaced to provide the volume of material with an approximately uniform density and with a majority of closed voids.

16. The method of claim 15, wherein the plurality of empty pipes are separated by a critical length ($\lambda_C$) that is dependent on the radius ($R_C$) of the plurality of holes used to form the plurality of empty pipes.

17. The method of claim 14, wherein the desired arrangement for the at least one empty space includes an arrangement of a plurality of empty pipes suitably positioned to provide the volume of material with a predictable fatigue site for a given force.

18. The method of claim 14, wherein the desired arrangement for the at least one empty space includes an arrangement of at least one empty sphere and at least one empty plate.

19. The method of claim 1, wherein the desired arrangement for the at least one empty space includes at least one empty plate.

20. The method of claim 19, wherein the desired arrangement for the at least one empty space includes an arrangement of empty plates suitably spaced to provide the volume of material with an approximately uniform density and with a majority of closed voids.

21. The method of claim 20, wherein the plurality of empty plates are separated by a critical length ($\lambda_C$) that is dependent on the radius ($R_C$) of the plurality of holes used to form the plurality of empty plates.

22. The method of claim 19, wherein the desired arrangement for the at least one empty space includes an arrangement of at least one empty plate suitably positioned to provide the volume of material with a predictable fatigue site for a given force.

23. The method of claim 19, wherein the desired arrangement for the at least one empty space includes an arrangement of at least one empty sphere and at least one empty pipe.

24. The method of claim 1, wherein the desired arrangement for the at least one empty space includes at least one empty sphere.

25. The method of claim 24, wherein the desired arrangement for the at least one empty space includes an arrangement of empty spheres suitably spaced to provide the volume of material with an approximately uniform density and with a majority of closed voids.

26. The method of claim 25, wherein the plurality of empty spheres are separated by a critical length ($\lambda_C$) that is dependent on the radius ($R_C$) of the plurality of holes used to form the plurality of empty spheres.

27. The method of claim 24, wherein the desired arrangement for the at least one empty space includes an arrangement of at least one empty sphere suitably positioned to provide the volume of material with a predictable fatigue site for a given force.

28. The method of claim 24, wherein the desired arrangement for the at least one empty space includes an arrangement of at least one empty plate and at least one empty pipe.

29. The method of claim 1, wherein the desired arrangement includes at least one empty void suitably positioned to provide the volume of material with a predictable fatigue site for a given force.

30. The method of claim 29, wherein the at least one empty void includes at least one empty sphere.

31. The method of claim 29, wherein the at least one empty void includes at least one empty plate.

32. The method of claim 29, wherein the at least one empty void includes at least one empty pipe.

33. The method of claim 1, wherein a relationship between stiffness (S) and density ($\rho$) for the cellular material approaches $S \propto \rho^{-2}$.

34. The method of claim 33, wherein the at least one empty void includes at least one empty sphere.

35. The method of claim 33, wherein the at least one empty void includes at least one empty plate.

36. The method of claim 33, wherein the at least one empty void includes at least one empty pipe.

37. The method of claim 1, wherein forming the desired arrangement and annealing includes:
    forming a first desired arrangement of a plurality of first holes in a volume of material through a first surface of the volume of material, each of the first holes having a desired length and diameter;
    annealing the volume of material such that the volume of material undergoes a surface transformation to transform the first arrangement of the first holes into a first arrangement of at least one empty space in the volume of material;
    forming a second desired arrangement of a plurality of second holes in the volume of material through a second surface of the volume of material, each of the second holes having a desired length and diameter; and
    annealing the volume of material such that the volume of material undergoes a surface transformation to transform the second arrangement of the second holes into a second arrangement of at least one empty space in the volume of material.

38. The method of claim 37, wherein the diameter of at least one of the first holes is different than the diameter of at least one of the second holes.

39. The method of claim 37, wherein the first arrangement of at least one empty spaced is interposed among the second arrangement of at least one empty space.

40. The method of claim 1, wherein forming the desired arrangement and annealing includes
    depositing a first layer of material;
    forming a first arrangement of holes through a surface of the first layer of material;
    annealing the first layer of material such that the first layer of material undergoes a surface transformation to transform the first arrangement of holes into a first arrangement of at least one empty space below the surface of the first layer of material;
    depositing a second layer of material on the first layer of material;
    forming a second arrangement of holes through a surface of the second layer of material; and
    annealing the second layer of material such that the second layer of material undergoes a surface transformation to transform the first arrangement of holes into a second arrangement of at least one empty space below the surface of the first layer of material.

41. The method of claim 40, wherein forming the first and second arrangement of holes includes controlling the diameter, the depth, and the spacing to provide the first and second layers of material with an approximately uniform density.

42. The method of claim 40, wherein forming the first and second arrangement of holes includes controlling the diameter, the depth, and the spacing to provide the first and second layers of material with a predictable metal fatigue site.

43. The method of claim 40, wherein forming the first and second arrangement of holes includes controlling the diameter, the depth, and the spacing to provide the first and second layers of material with a predictable deformation for a given force.

44. The method of claim 1, wherein the cellular material is engineered with the predetermined arrangement of the at least one empty space to provide at least a portion of the cellular material with a relationship between stiffness (S) and density ($\rho$) that approaches $S \propto \rho^2$.

45. The method of claim 1, wherein determining the desired arrangement of at least one empty space includes determining the desired arrangement of a plurality of spaces to provide the cellular material with a predictable mechanical failure.

46. The method of claim 1, wherein determining the desired arrangement of at least one empty space includes determining the desired arrangement of a plurality of spaces to provide the cellular material with anisotropic stiffness.

* * * * *

UNITED STATES PATENT AND TRADEMARK OFFICE
CERTIFICATE OF CORRECTION

| | | |
|---|---|---|
| PATENT NO. | : 7,964,124 B2 | Page 1 of 1 |
| APPLICATION NO. | : 11/353406 | |
| DATED | : June 21, 2011 | |
| INVENTOR(S) | : Joseph E. Geusic | |

It is certified that error appears in the above-identified patent and that said Letters Patent is hereby corrected as shown below:

On the Title page, in field (56), under "Other Publications", in column 2, line 1, delete "Ban Hart," and insert -- Banhart, --, therefor.

In column 14, line 27, in Claim 39, delete "spaced" and insert -- space --, therefor.

In column 14, line 30, in Claim 40, after "includes" insert -- : --.

Signed and Sealed this
Ninth Day of August, 2011

David J. Kappos
*Director of the United States Patent and Trademark Office*